(12) United States Patent
Weerasinghe et al.

(10) Patent No.: US 8,435,624 B2
(45) Date of Patent: May 7, 2013

(54) WEAR-RESISTING SURFACE STRUCTURE

(75) Inventors: Vijitha Maithri Weerasinghe, London (GB); Roger D. Hibberd, London (GB); Surangsee Dechjarern, Samuthprakarn (TH)

(73) Assignee: Imperial College Innovations Limited, London (GB)

( * ) Notice: Subject to any disclaimer, the term of this patent is extended or adjusted under 35 U.S.C. 154(b) by 2601 days.

(21) Appl. No.: 10/962,994

(22) Filed: Oct. 12, 2004

(65) Prior Publication Data

US 2005/0181174 A1    Aug. 18, 2005

(30) Foreign Application Priority Data

Oct. 13, 2003 (GB) .................................. 0323948.0

(51) Int. Cl.
*D06N 7/04* (2006.01)
(52) U.S. Cl.
USPC ........................................................... 428/141
(58) Field of Classification Search .................... 428/143
See application file for complete search history.

(56) References Cited

U.S. PATENT DOCUMENTS

| | | | |
|---|---|---|---|
| 5,558,789 A | | 9/1996 | Singh |
| 5,648,119 A | | 7/1997 | Grab et al. |
| 5,722,803 A | * | 3/1998 | Battaglia et al. ............... 407/119 |
| 5,853,850 A | * | 12/1998 | Iwai et al. ...................... 428/148 |
| 6,655,181 B2 | * | 12/2003 | Morales ............................ 72/42 |
| 2002/0001717 A1 | | 1/2002 | Hanyu |

FOREIGN PATENT DOCUMENTS

| | | |
|---|---|---|
| GB | 2 247 693 | 3/1992 |
| JP | 7003549 | 1/1995 |
| WO | 97/03777 | 2/1997 |
| WO | 02/088414 | 11/2002 |
| WO | 03/043769 | 5/2003 |

OTHER PUBLICATIONS

Martinez et al., "Diamond coatings on electrical-discharge machined hardmetals", Diamond and Related Materials, 2003, pp. 762-767.

* cited by examiner

*Primary Examiner* — Mark Ruthkosky
*Assistant Examiner* — Linda Chau
(74) *Attorney, Agent, or Firm* — Renner, Otto, Boisselle & Sklar, LLP (57) ABSTRACT

A component comprising a body including a roughened contact surface comprising peaks and valleys, and a conformal coating of a coating material at the roughened surface, wherein the roughened surface has a surface roughness which is such that the valleys define voids in which coating material is entrapped during wear of the component in exposing the body, with the entrapped coating material conferring improved wear resistance.

18 Claims, 7 Drawing Sheets

■ =TiN coating  10μm

WEAR-RESISTING SURFACE STRUCTURE

The present invention relates to a wear-resisting surface structure, which finds particular, but not exclusive, application in contact surfaces, and contact structures, such as machine tools, for example, cutting and forming tools, and seal components, incorporating such a wear-resisting surface.

Machine tools are used in machining workpieces, and the continuous development of new materials, in particular, places increasing requirements on such tools. There is thus a demand for improved machine tools which allow for the machining of these new materials effectively and efficiently, and have a longer tool life. As will be appreciated, tool life directly effects manufacturing costs and productivity, in that higher wear leads to greater machine downtime.

As an example of machining operations, cutting operations involve the shearing of the workpiece so that a layer of chip is formed. The contact conditions at the tool interface are very severe and determine the tool life, in influencing the friction coefficient, the contact length, the amount of wear debris, the contact pressure and the temperature.

There are many kinds of wear mechanisms, these include adhesive wear, abrasive wear, delamination wear, fatigue wear, chemical wear, which includes diffusive/corrosive and oxidative wear, fretting wear and erosive wear, with the effect of each wear mechanism varying depending on the operation speed and the interface conditions.

There are many kinds of tool wear, these include: (i) flank wear which is caused by a combination of abrasion wear and adhesion wear and is usually greatest at the extremities of the active cutting edge, (ii) built-up edge (BUE) which is the build up of wear debris near the tip of the cutting edge, (iii) crater wear which is the formation of a groove or a crater on the rake surface of the tool near the cutting edge, (iv) notch/groove wear which is the formation of a notch or groove at an end of the cutting edge by oxidation, (v) thermal cracking which is the formation of cracks on the tool surface, usually initiated at the hottest region of the rake surface of the tool, (vi) plastic deformation/fracture which is the plastic deformation at the cutting edge caused by the high temperature and pressure, with fracture being a consequence where a built-up edge is formed and material is torn out, and (vii) which is the formation of chips at the cutting edge.

Coated machine tools provide for much increased tool life, in providing increased wear resistance, hardness and chemical stability at high temperatures, but in particular reduced friction at the tool interface which leads to reduced heat generation.

In the development of machine tools, most of the research has been to identifying improved coating materials which have lower friction and higher wear resistance. Presently, typical coating materials include TiN, TiC, Ti(Al,N) and Ti(C,N), and superhard coating materials, such as diamond and cubic boron nitride (cBN).

As disclosed, for example, in WO-A-97/03777, coated cutting tools have also been developed where the surface of the substrate is treated prior to coating to have a predetermined surface roughness, which surface roughness provides for improved adherence of the coating. This surface roughness is either introduced in the step of forming the substrate by the forming tool having the required surface roughness or by subsequent processing, such as grinding, electric discharge machining (EDM) or laser etching.

Although the present invention finds particular application in relation to machine tools, such as cutting and forming tools, the wear-resisting surface of the present invention finds application in relation to any components which are subject to wear.

By way of example, another such application is in relation to seal components which rely on the seal achieved by the clamping of two hard sealing surfaces, without the use of any flexible sealing element therebetween. Such sealing surfaces are highly loaded and thus subject to high degrees of wear.

It is an aim of the present invention to provide a wear-resisting surface structure, and contact components incorporating the same, such as machine tools, and seal components, thereby providing increased wear resistance, and a longer component life.

In one aspect the present invention provides a component comprising a body including a roughened contact surface comprising peaks and valleys, and a conformal coating of a coating material at the roughened surface, wherein the roughened surface has a surface roughness which is such that the valleys define voids in which coating material is entrapped on wear of the component to expose the body, with the entrapped coating material conferring improved wear resistance.

Preferably, the roughened surface has a surface roughness ratio $R_q/R_{sm}$ of from about 0.0375 to about 0.0475, wherein: $R_q$ is the root mean square roughness parameter defined by:

$$Rq = \left(\frac{1}{L}\int_L z^2\, dx\right)^{1/2}$$

where z is the height of the surface measured above the mean level which is a line drawn such that the area of material above the line is equal to the void below the line, and L is the measurement length; and $R_{sm}$ is the mean spacing of profile irregularities defined by:

$$Rsm = \frac{1}{n}\sum_{i=1}^{i=n} s_i$$

where $s_i$ is the distance between two mean line crossings, and n is the number of peaks within the sample length.

More preferably, the roughened surface has a surface roughness ratio $R_q/R_{sm}$ of from about 0.04 to about 0.0475.

Yet more preferably, the roughened surface has a surface roughness ratio $R_q/R_{sm}$ of from about 0.04 to about 0.045.

Preferably, the roughened surface is an electro-discharge machined (EDM) surface.

Preferably, the body is formed of a carbide.

More preferably, the carbide is tungsten carbide.

Preferably, the coating has a thickness of not greater than about 5 μm.

Preferably, the coating is a coating selected from the group consisting of TiN, TiC, Ti(Al,N), Ti(C,N), and superhard coating materials, such as diamond and cubic boron nitride (cBN).

In one embodiment the component is a machine tool, such as a cutting or forming tool.

In another embodiment the component is a seal element.

In another aspect the present invention provides a component comprising a body including a roughened contact surface comprising peaks and valleys, and a conformal coating of a coating material at the roughened surface, wherein the roughened surface has a surface roughness which is such that the valleys define pockets which entrap residual coating material during wear of the component, with the entrapped coating material acting to confer improved wear resistance.

In a further aspect the present invention provides a component comprising a body including a roughened contact surface comprising peaks and valleys, and a conformal coating of a coating material at the roughened surface, wherein peaks of the roughened surface have a height which is greater than a height of the coating in valleys of the roughened surface, such that, during wear of the component in exposing the body, valleys define voids in which coating material is entrapped.

In a yet further aspect the present invention provides a component comprising a body including a roughened contact surface comprising peaks and valleys, and a coating of a coating material at the roughened surface, wherein the roughened surface has a surface roughness which is such that the valleys define voids in which coating material is entrapped on wear of the component to expose the body.

In a still further aspect the present invention relates to the use of a roughened surface comprising peaks and valleys and including a conformal coating of a coating material at the roughened surface as a wear-resisting structure, wherein the roughened surface has a surface roughness which is such that the valleys define pockets which entrap residual coating material during wear, with the entrapped coating material acting to confer improved wear resistance.

In yet another aspect the present invention relates to the use of a roughened surface comprising peaks and valleys and including a conformal coating of a coating material at the roughened surface as a wear-resisting structure, wherein peaks of the roughened surface have a height which is greater than a height of the coating in valleys of the roughened surface, such that, during wear of the component in exposing the body, valleys define voids in which coating material is entrapped.

Preferred embodiments of the present invention will now be described hereinbelow by way of example only with reference to the accompanying drawings, in which.

Figure 1:
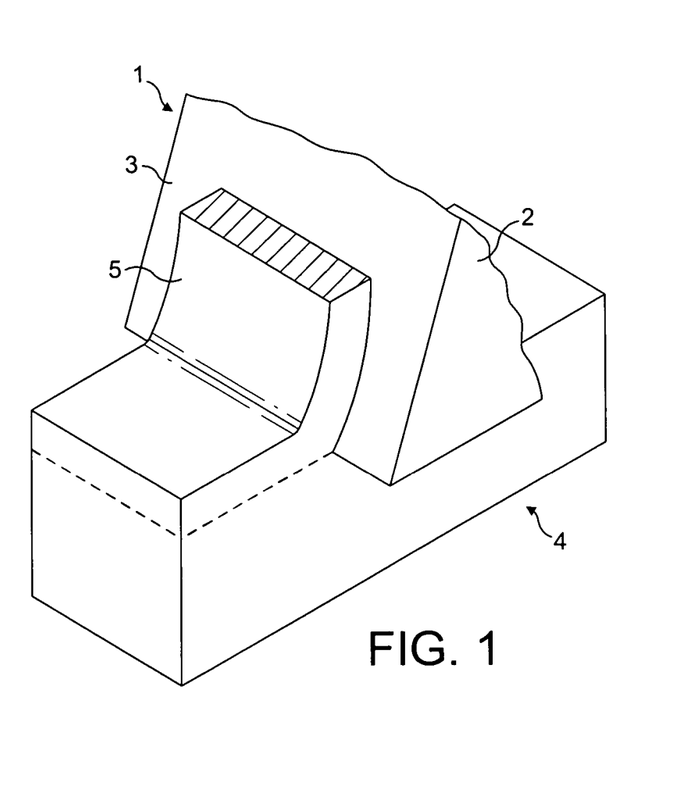
FIG. 1 illustrates a tip of a machine tool in accordance with a preferred embodiment of the present invention.

The machining tool 1, in this embodiment a cutting tool, comprises a tool body 2 which includes a tool surface 3, in this embodiment a rake face, over which material cut from a workpiece 4, as chip material 5, flows in a machining operation. In this embodiment, as illustrated in FIG. 1, and by way of example only, the cutting tool 1 is configured for orthogonal cutting.

In this embodiment the tool body 2 is formed of a tungsten carbide as specified for mild steel and cast iron machining. In other embodiments the tool body 2 could be formed of any suitable material.

The tool surface 3 comprises a surface roughness at a surface of the tool body 2, in this embodiment as fabricated by electro-discharge machining (EDM) of the tool body 2, and a conformal coating at the surface of the tool body 2, in this embodiment a TiN coating. In other embodiments the coating could comprise TiC, Ti(Al,N) and Ti(C,N), and superhard coating materials, such as diamond and cubic boron nitride (cBN).

EDM is a machining technique which provides for the removal of material by applying a succession of discrete discharges between a surface of a component, in this embodiment the tool surface 3 of the tool body 2, and an electrode.

Figure 2:
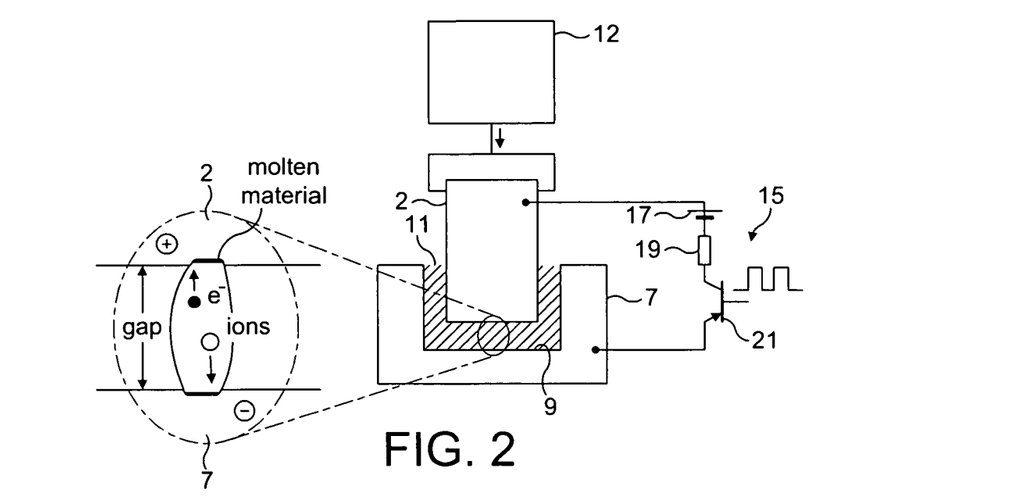
FIG. 2 illustrates an electro-discharge machining (EDM) apparatus as employed in fabricating machine tools of the present invention.

FIG. 2 illustrates an EDM apparatus for forming surface-roughened tool surfaces 3 on tool bodies 2.

The EDM apparatus comprises an electrode 7 which includes a cavity 9 in which a tool body 2 is disposed and which contains a dielectric fluid 11, a feed mechanism 12 for advancing the tool body 2 at a predeterminable feed rate such as to maintain the gap between the tool body 2 and the electrode 7, and a pulse generator 15 for applying a pulsed electric field between the tool body 2 and the electrode 7 across the dielectric fluid. Common dielectric fluids include paraffin, kerosene, mineral oil, or a mixture thereof.

Each electric field pulse causes ionisation of the dielectric fluid, and flows of electrons from the electrode 7 through ionised paths in the dielectric fluid to the tool body 2. The resulting associated current pulse provides for heating and vaporizing of material of the tool body 2 at each electron flow, thereby providing for discharge machining of the tool body 2.

In this embodiment the pulse generator 15 comprises a dc supply 17 which is coupled to the tool body 2 and the electrode 7 through a load resistor 19 and an electronic switch 21.

Figure 3:
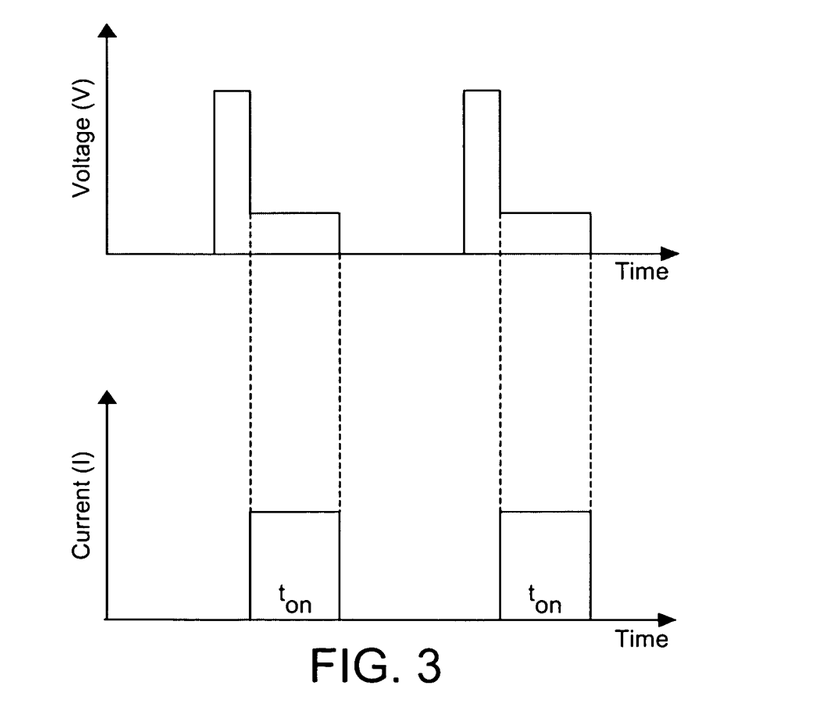
FIG. 3 illustrates the voltage and current characteristics of the pulse generator of the EDM apparatus of FIG. 2.

FIG. 3 illustrates the voltage and current characteristics of the pulse generator 15, where the pulse duration $t_{on}$ of the discharge pulses is regulated by the duty cycle, that is, the ratio of the on/off periods of the pulsed electric field, and the discharge current I is regulated by the size of the load resistor 19.

The surface fabricated by EDM is a cratered structure, with the degree of surface roughness, as defined by the size of craters, being determined by the energy per discharge pulse. The surface roughness decreases with an increase in pulse frequency and a reduction in the discharge current I. Thus, rougher surfaces are created using longer pulse lengths $t_{on}$. For spark-eroded surfaces, it has been found that the asperity heights can be reasonably approximated by a Gaussian distribution (Sayles & Thomas, 1978).

EXAMPLE

The present invention will now be described hereinbelow with reference to the following non-limiting Example.

In this Example, tool bodies 2 comprising commercial tungsten carbide tool inserts were subjected to EDM. The surfaces of the tool bodies 2 were initially very smooth. The EDM machining conditions used are given in Table 1 hereinbelow. Various combinations of EDM machine parameters, namely, the current intensity I and the pulse duration $t_{on}$, as given in Table 2, were employed to create tool surfaces 3 having different surface characteristics.

TABLE 1

EDM Settings

| Setting | Value |
|---|---|
| Pulse off | 6 ms |
| Electrode | copper-tungsten |
| Dielectric medium | paraffin |

TABLE 2

EDM Parameters

| I (rms A) | $t_{on}$ (ms) |
|---|---|
| 3.30 | 0.200 |
| 3.00 | 0.200 |
| 2.35 | 0.200 |
| 1.70 | 0.100 |
| 1.40 | 0.100 |
| 1.10 | 0.100 |
| 0.30 | 0.040 |
| 0.20 | 0.040 |

The tool bodies 2 were then coated with a 4 μm coating of TiN; this being the coating most commonly used in coating machine tools. By utilising a thin coating, the profile of the uncoated EDM surface topography of the tool bodies 2 is maintained. In this Example, the coating was deposited by physical vapor deposition (PVD). In an alternative embodiment the coating could be deposited by chemical vapor deposition (CVD).

Surface measurements were obtained prior and subsequent to coating the tool surface 3 using a profilometer and scanning electron microscopy (SEM).

In this embodiment the surfaces of the tool bodies 2 are characterized by the root mean square roughness parameter $R_q$ and the mean spacing of profile irregularities $R_{sm}$.

The root mean square roughness parameter $R_q$ is defined by:

$$Rq = \left(\frac{1}{L}\int_L z^2\, dx\right)^{1/2}$$

Where: z is the height of the surface measured above the mean level which is a line drawn such that the area of material above the line is equal to the void below the line; and
L is the measurement length.

The mean spacing of profile irregularities $R_{sm}$, that is, the mean distance between peaks along the mean line, is defined by:

$$Rsm = \frac{1}{n}\sum_{i=1}^{i=n} s_i$$

Where: $s_i$ is the distance between two mean line crossings; and
n is the number of peaks within the sample length.

Figure 4A:
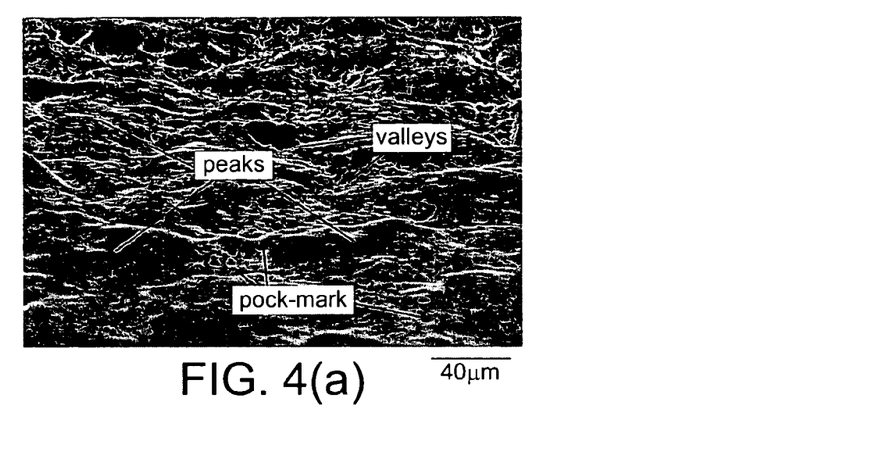
FIG. 4(a) is an SEM micrograph of an EDM surface obtained by the apparatus of FIG. 2.

FIG. 4(a) is an SEM micrograph of an EDM surface obtained with I=3 A and $t_{on}$=0.2 ms prior to coating. During each electrical discharge, intense heat is generated, causing local melting/vaporisation of the surface of the tool body 2. With each discharge, a crater is formed on the surface of the tool body 2. As can be seen, valleys are defined from pools of molten metal and overlapping peaks are created by EDM, with pock marks also being evident.

Figure 4B:
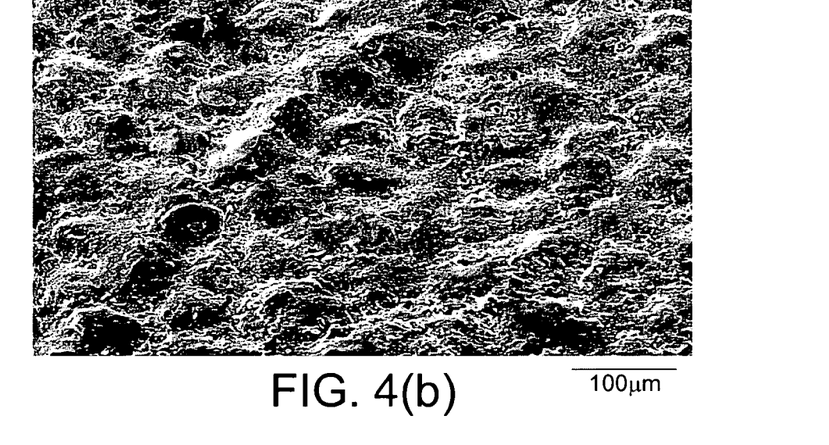
FIG. 4(b) is an SEM micrograph of the EDM surface of FIG. 4(a) where coated.
Figure 4C:
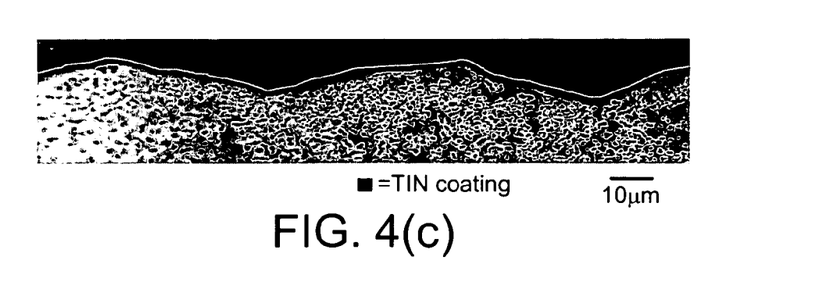
FIG. 4(c) illustrates a cross-section through the coated surface of FIG. 4(b)

FIG. 4(b) is an SEM micrograph of the EDM surface of FIG. 4(a) where coated with the TiN coating. The surface topology of the coated surface is substantially the same as that of the uncoated surface except for the absence of pock marks, with the surface profile of the thin coating conforming to the uncoated EDM surface. FIG. 4(c) illustrates a cross-section through the coated surface of FIG. 4(b). This cross section clearly shows that the coating follows the profile of the EDM surface.

Figure 5A:
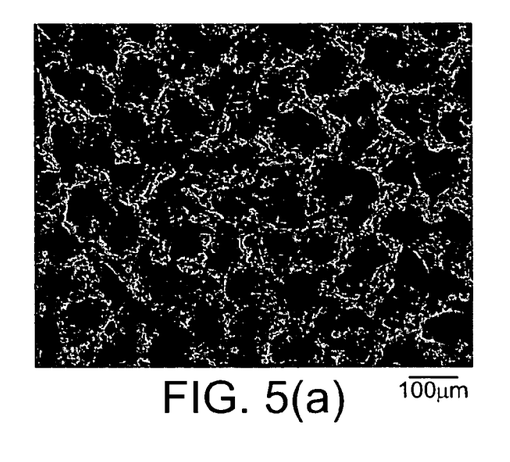
FIGS. 5(a) to (c) are SEM micrographs for three EDM surfaces obtained by the EDM apparatus of FIG. 2 using different EDM parameters.
Figure 5B:
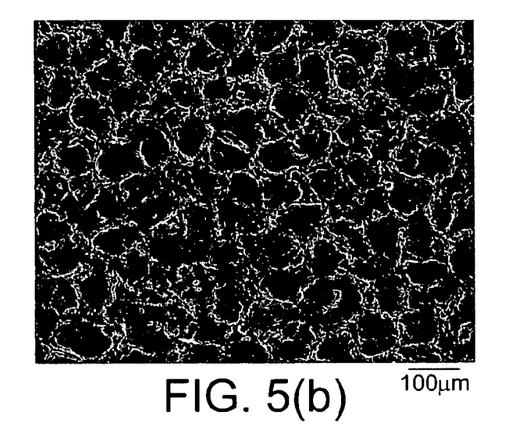
Figure 5C:
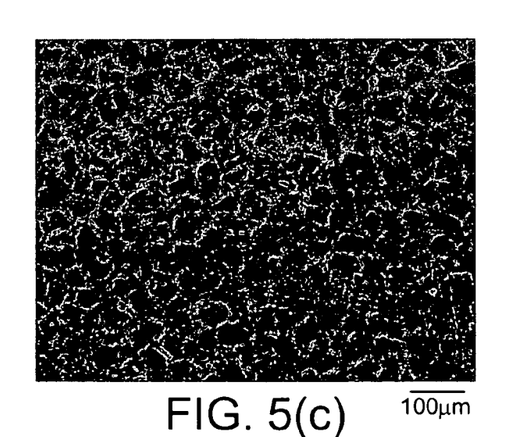

FIGS. 5(a) to (c) are SEM micrographs for three EDM surfaces obtained using different EDM parameters. FIG. 5(a) illustrates an EDM surface obtained where I=3 A and $t_{on}$=0.2 ms. FIG. 5(b) illustrates an EDM surface obtained where I=1.4 A and $t_{on}$=0.1 ms. FIG. 5(c) illustrates an EDM surface obtained where I=0.3 A and $t_{on}$=0.04 ms. As is clearly evident, the size of the peaks and valleys are dependent upon the EDM parameters.

Ones of the samples were then subjected to cutting tests on sample test pieces, in this embodiment of mild steel and cast iron. In this Example, AISI 4340 mild steel and cast iron were used as workpieces so as to enable the testing of different kinds of material which yield different kinds of chip. In metal cutting, the kind of chip formed is dependent on the material properties at a high strain rate. Cast iron normally produces discontinuous chips, while more ductile materials, such as steel, form continuous chips.

The cutting conditions were as set out in Table 3 hereinbelow, these being the cutting conditions recommended for tungsten carbide tools. Measurements were taken after 3, 6, 11, 18 and 23 minutes of cutting time.

TABLE 3

Cutting Test Conditions and Tool Geometry

| Parameter | Value |
|---|---|
| Cutting Speed | 120 mm min$^{-1}$ |
| Feed rate | 0.4 mm rev$^{-1}$ |
| Depth of Cut | 1.0 mm |
| Rake Angle | 6° |
| Clearance Angle | 6° |
| Approach Angle | 10° |
| Nose Radius | 25 μm |

From these cutting tests, and by reference to (I) the coating damage ($D_c$) on the tool surfaces, (II) the cutting tool/chip contact length ($L_c$) and (III) the tool flank wear (VB), the present inventors have determined that surfaces having selected ranges of a surface roughness ratio $R_q/R_{sm}$ provide for improved wear performance.

(I) Coating Damage ($D_c$) on Tool Surface

The percentage of coating damage $D_c$ on the tool surface 3, here the rake surface, is determined by:

$$D_c = 100(1 - S_t/A_n)$$

Where: $S_t$ is the area of coating remaining on the tool surface 3; and $A_n$ is the nominal contact area.

The remaining area of coating St was measured using a light optical microscope (LOM) and image analysis software. In this Example, the nominal contact area $A_n$ was 25 mm².

Figure 6:
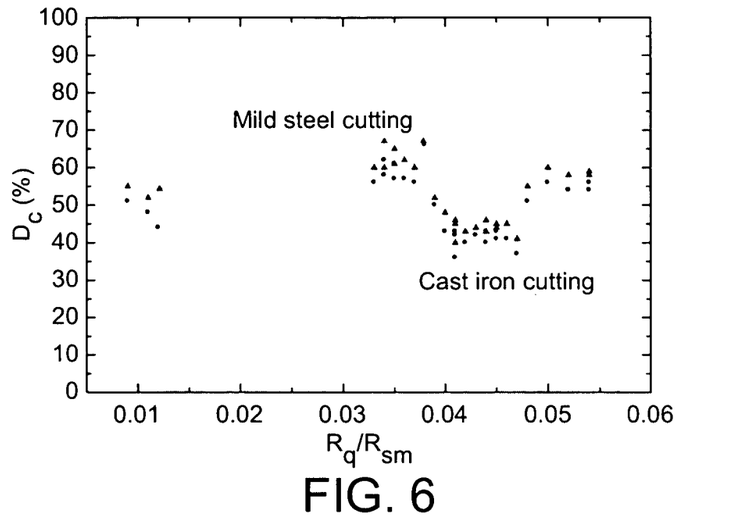
FIG. 6 illustrates the variation in the coating damage $D_c$ as a function of the surface roughness ratio $R_q/R_{sm}$ for mild steel and cast iron test pieces.

FIG. 6 illustrates the variation in the coating damage $D_c$ as a function of the surface roughness ratio $R_q/R_{sm}$ for mild steel and cast iron test pieces.

Figure 7:
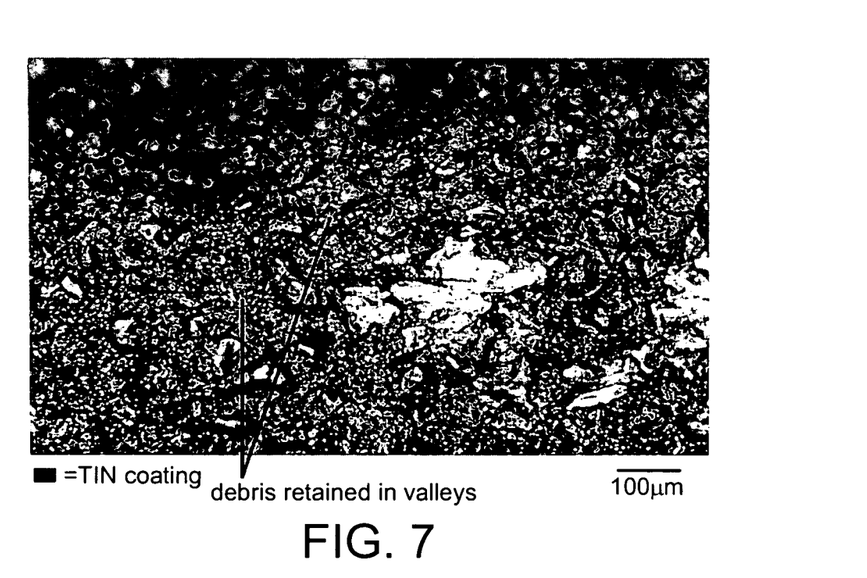
FIG. 7 is an SEM micrograph illustrating debris retained in the valleys surrounding the coated peaks in the tool surface of one machine tool in accordance with a preferred embodiment of the present invention following machining of a test piece.

It is clear that the coating damage $D_c$ varies with the surface roughness ratio $R_q/R_{sm}$, and that the trend in the variation in the coating damage $D_c$ is similar for both the mild steel and cast iron test pieces. The lowest values of the coating damage $D_c$ are achieved where the surface roughness ratio $R_q/R_{sm}$ is in the range of about 0.0375 to about 0.0475, in particular in the range of about 0.04 to about 0.0475, and most particularly in the range of about 0.04 to about 0.045. It is postulated that the minimization of the value of the coating damage $D_c$ for the mentioned ranges is as a consequence of debris being retained within the valleys between peaks in the tool surface 3. FIG. 7 is an SEM micrograph illustrating debris retained in the valleys surrounding the coated peaks in the tool surface 3 of one cutting tool 1.

(II) Cutting Tool/Chip Contact Length ($L_c$)

The cutting tool/chip contact length $L_c$ is the distance over which a chip 5 is in contact with the tool surface 3 as measured from the tip of the cutting tool 1.

Figure 8:
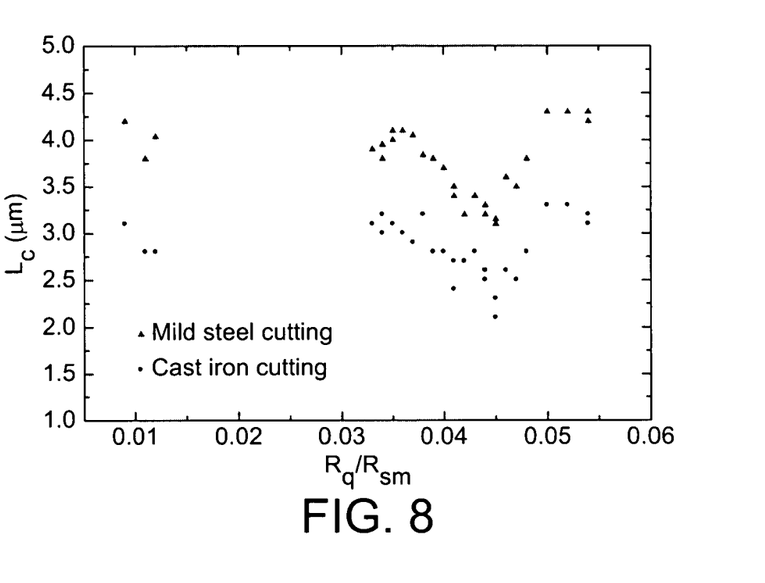
FIG. 8 illustrates the variation in the tool/chip contact length $L_c$ as a function of the surface roughness ratio $R_q/R_{sm}$ for both mild steel and cast iron test pieces.

FIG. 8 illustrates the variation in the cutting tool/chip contact length $L_c$ as a function of the surface roughness ratio $R_q/R_{sm}$ for both mild steel and cast iron test pieces. As will be noted, the cutting tool/chip contact lengths $L_c$ from cast iron test pieces are shorter than those from the mild steel test pieces, as the chips from cast iron are discontinuous and break readily.

It is clear that the cutting tool/chip contact length $L_c$ varies with the surface roughness ratio $R_q/R_{sm}$, and that the trend in the variation in the cutting tool/chip contact length $L_c$ is similar for both the mild steel and cast iron test pieces. The lowest values of the cutting tool/chip contact length $L_c$ are achieved where the surface roughness ratio $R_q/R_{sm}$ is in the range of about 0.0375 to about 0.0475, in particular in the range of about 0.04 to about 0.0475, and most particularly in the range of about 0.04 to about 0.045. It is postulated that the minimization of the value of the cutting tool/chip contact length $L_c$ for the mentioned ranges is as a consequence of the tool surface 3 having a lower coefficient of friction relative to the real area of contact $A_r$, with debris being retained within the valleys between peaks in the cutting surface 3 such as not to cause an increase in the friction coefficient.

(III) Tool Flank Wear (VB)

Figure 9:
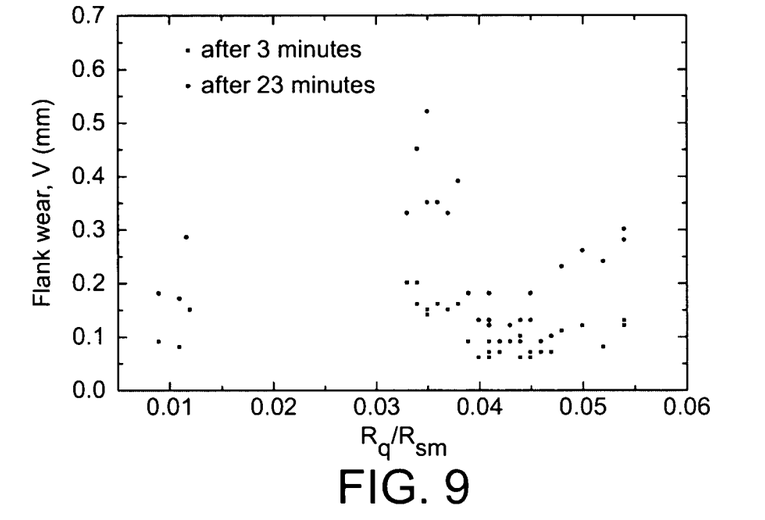
FIG. 9 illustrates the variation in flank wear VB as a function of the surface roughness ratio $R_q/R_{sm}$ for machining times of 3 minutes and 23 minutes for mild steel test pieces.
Figure 10:
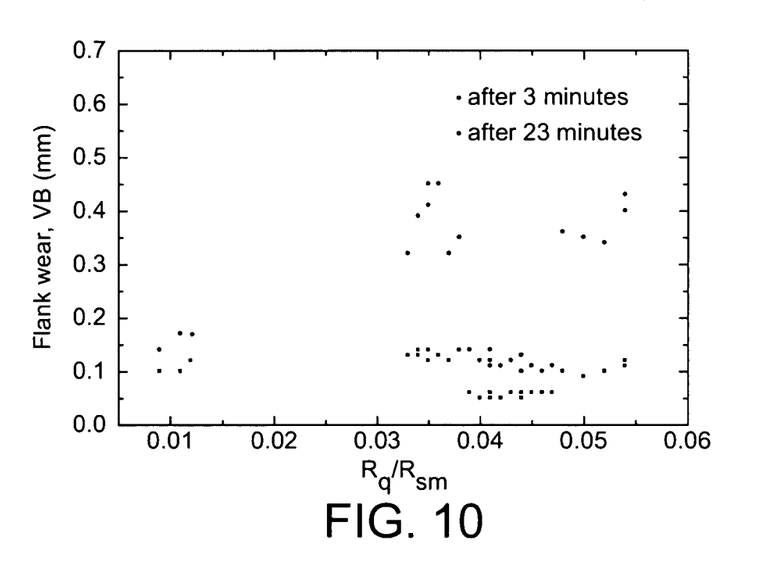
FIG. 10 illustrates the variation in flank wear VB as a function of the surface roughness ratio $R_q/R_{sm}$ for machining times of 3 minutes and 23 minutes for cast iron test pieces.

FIGS. 9 and 10 illustrate the variation in flank wear VB as a function of the surface roughness ratio $R_q/R_{sm}$ for cutting times of 3 minutes and 23 minutes for both mild steel and cast iron test pieces.

It is clear that the flank wear VB varies with the surface roughness ratio $R_q/R_{sm}$, and that the trend in the variation in the flank wear VB is similar for both the mild steel and cast iron test pieces. Flank wear VB is generally higher in the mild steel test pieces owing to the mechanism of build-up edge (BUE). The lowest values of the flank wear VB are achieved where the surface roughness ratio $R_q/R_{sm}$ is in the range of about 0.0375 to about 0.0475, in particular in the range of about 0.04 to about 0.0475, and most particularly in the range of about 0.04 to about 0.045. It is postulated that the minimization of the rate of the flank wear VB for the mentioned ranges is as a consequence of the surface having a lower coefficient of friction relative to the real area of contact $A_r$, and debris being retained within the valleys between peaks in the cutting surface 3 of the cutting tool 1 such as not to cause an increase in the friction coefficient.

Finally, it will be understood that the present invention has been described in its preferred embodiments and can be modified in many different ways without departing from the scope of the invention as defined by the appended claims.

The invention claimed is:

1. A component comprising a body including a roughened contact surface comprising peaks and valleys, and a conformal coating of a coating material at the roughened contact surface of the body, wherein the coated surface has a surface roughness which is such that the valleys define voids between peaks of the roughened contact surface of the body, in which coating material is entrapped during wear of the component in exposing the body, with the entrapped coating material conferring improved wear resistance.

2. The component of claim 1, wherein the roughened contact surface of the body has a surface roughness ratio $R_q/R_{sm}$ of from about 0.0375 to about 0.0475, wherein:

$R_q$ is the root mean square roughness parameter defined by:

$$Rq = \left(\frac{1}{L}\int_L z^2\, dx\right)^{1/2}$$

where z is the height of the surface measured above the mean level which is a line drawn such that the area of material above the line is equal to the void below the line, and L is the measurement length; and $R_{sm}$ is the mean spacing of profile irregularities defined by:

$$Rsm = \frac{1}{n}\sum_{i=1}^{i=n} s_i$$

where $s_i$ is the distance between two mean line crossings, and n is the number of peaks within the sample length.

3. The component of claim 2, wherein the roughened contact surface of the body has a surface roughness ratio $R_q/R_{sm}$ of from about 0.04 to about 0.0475.

4. The component of claim 3, wherein the roughened contact surface of the body has a surface roughness ratio $R_q/R_{sm}$ of from about 0.04 to about 0.045.

5. The component of claim 1, wherein the roughened contact surface of the body is an electro-discharge machined (EDM) surface.

6. The component of claim 1, wherein the body is formed of a carbide.

7. The component of claim 6, wherein the carbide is tungsten carbide.

8. The component of claim 1, wherein the coating has a thickness of not greater than about 5 μm.

9. The component of claim 1, wherein the coating is a coating selected from the group consisting of TiN, TiC, Ti(Al,N), Ti(C,N), and superhard coating materials, including diamond and cubic boron nitride (cBN).

10. The component of claim 1, wherein the component is a machine tool.

11. The component of claim 10, wherein the component is a cutting tool.

12. The component of claim 10, wherein the component is a forming tool.

13. The component of claim 1, wherein the component is a seal element.

14. A wear-resisting component comprising a body including a roughened contact surface comprising peaks and valleys, and a conformal coating of a coating material at the roughened contact surface of the body, wherein peaks of the roughened contact surface of the body have a height which is greater than a height of the coating in valleys of the roughened contact surface of the body, thereby defining voids between peaks of the roughened contact surface of the body, in which coating material is entrapped during wear of the component in exposing the body.

15. The component of claim 14, wherein the component is a machine tool.

16. The component of claim 15, wherein the component is a cutting tool.

17. The component of claim 15, wherein the component is a forming tool.

18. The component of claim 14, wherein the component is a seal element.

\* \* \* \* \*